US010740364B2

(12) United States Patent
Cheung

(10) Patent No.: US 10,740,364 B2
(45) Date of Patent: *Aug. 11, 2020

(54) CATEGORY-CONSTRAINED QUERYING USING POSTAL ADDRESSES

(71) Applicant: eBay Inc., San Jose, CA (US)

(72) Inventor: Dennis Cheung, San Francisco, CA (US)

(73) Assignee: EBAY INC., San Jose, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 15/700,583

(22) Filed: Sep. 11, 2017

(65) Prior Publication Data

US 2018/0067968 A1    Mar. 8, 2018

Related U.S. Application Data

(63) Continuation of application No. 14/067,795, filed on Oct. 30, 2013, now Pat. No. 9,773,018.
(Continued)

(51) Int. Cl.
*G06F 16/215* (2019.01)
*G06F 16/29* (2019.01)
(Continued)

(52) U.S. Cl.
CPC ............ *G06F 16/29* (2019.01); *G06Q 30/00* (2013.01); *G06Q 30/0241* (2013.01); *G06Q 30/0601* (2013.01); *H04M 15/47* (2013.01)

(58) Field of Classification Search
CPC .................................................. G06F 16/215
(Continued)

(56) References Cited

U.S. PATENT DOCUMENTS

| 2,465,971 A | 3/1949 | Leblang |
| 2,931,657 A | 4/1960 | Lewis |

(Continued)

FOREIGN PATENT DOCUMENTS

| CN | 1750001 A | 3/2006 |
| CN | 101764973 A | 6/2010 |

(Continued)

OTHER PUBLICATIONS

Advisory Action received for U.S. Appl. No. 14/067,795 dated Aug. 30, 2016, 5 pages.
(Continued)

*Primary Examiner* — Baoquoc N To
(74) *Attorney, Agent, or Firm* — Shook, Hardy & Bacon L.L.P.

(57) ABSTRACT

Systems and methods are provided for optimizing querying of distributed systems. A system, including a plurality of subsystems each associated with one or more categories, can receive a query from a client device. The system can determine the categories associated with the query. The system can also identify a postal address associated with the query, such as by receiving the location of the client device and mapping the location to a postal address. The system can determine a category unrelated to the postal address and constrain (e.g., sort or filter) the query (and/or query results) based on the remaining categories. In addition, or alternatively, the system can constrain the query (and/or query results) to categories associated with the postal address. The system can also constrain the query (and/or query results) based on time or date, weather information, user profile information, ambient light information, motion information, etc.

20 Claims, 12 Drawing Sheets

| ONE CATEGORY 902 | | PERMIT ONLY ONE CATEGORY CONSTRAINT AT A TIME. EX: {STRING} @ SPORTS AUTHORITY = SPORTING GOODS CATEGORY |
| MANY CATEGORIES 904 | | MULTIPLE CATEGORY CONSTRAINTS AT A TIME. EX: {LION} @ SF ZOO = CSA + TOYS & HOBBIES + DOLLS CATS |
| MANY CATEGORIES + TIME 906 | | ADD TIME AS A DIMENSION FOR MULTIFUNCTIONAL VENUES. EX: {SHIRT} @ MSG ON 12/8 (KNICKS) = SPORTS MEM CAT, ON 12/9 (ROD STEWART) = ENTERTAINMENT MEM CAT. 6/4 (DOG SHOW) = PET SUPPLIES CAT |

Related U.S. Application Data

(60) Provisional application No. 61/865,426, filed on Aug. 13, 2013.

(51) Int. Cl.
  *G06Q 30/02* (2012.01)
  *G06Q 30/06* (2012.01)
  *H04M 15/00* (2006.01)
  *G06Q 30/00* (2012.01)

(58) Field of Classification Search
  USPC .................. 707/705, 706, 708, 724, 769
  See application file for complete search history.

(56) References Cited

U.S. PATENT DOCUMENTS

| | | | |
|---|---|---|---|
| 3,252,243 A | 5/1966 | Doyle et al. | |
| 3,675,215 A | 7/1972 | Arnold et al. | |
| 3,717,942 A | 2/1973 | Presby | |
| 5,408,417 A | 4/1995 | Wilder | |
| 5,605,332 A | 2/1997 | Harnett | |
| 6,112,226 A | 8/2000 | Weaver et al. | |
| 6,134,674 A | 10/2000 | Akasheh | |
| 6,146,721 A | 11/2000 | Freynet | |
| 6,216,134 B1 | 4/2001 | Heckerman et al. | |
| 6,244,926 B1 | 6/2001 | George et al. | |
| 6,363,388 B1 | 3/2002 | Sprenger et al. | |
| 6,561,417 B1 | 5/2003 | Gadd | |
| 6,567,797 B1 | 5/2003 | Schuetze et al. | |
| 6,714,945 B1 | 3/2004 | Foote et al. | |
| 6,804,662 B1 | 10/2004 | Annau et al. | |
| 6,970,101 B1 | 11/2005 | Squire et al. | |
| 7,062,722 B1 | 6/2006 | Carlin et al. | |
| 7,082,365 B2 | 7/2006 | Sheha et al. | |
| 7,240,025 B2 | 7/2007 | Stone et al. | |
| 7,346,543 B1 | 3/2008 | Edmark | |
| 7,363,214 B2 | 4/2008 | Musgrove et al. | |
| 7,519,562 B1 | 4/2009 | Vander et al. | |
| 7,568,004 B2 | 7/2009 | Gottfried | |
| 7,587,359 B2 | 9/2009 | Levy et al. | |
| 7,664,767 B2 * | 2/2010 | Virdy | G06Q 30/02 707/708 |
| 7,689,916 B1 | 3/2010 | Goel et al. | |
| 7,752,082 B2 | 7/2010 | Calabria | |
| 7,756,757 B1 | 7/2010 | Oakes, III | |
| 7,761,339 B2 | 7/2010 | Alivandi | |
| 7,827,074 B1 | 11/2010 | Rolf | |
| 7,840,456 B2 * | 11/2010 | Patzer | G06Q 20/10 705/30 |
| 7,848,764 B2 | 12/2010 | Riise et al. | |
| 7,848,765 B2 | 12/2010 | Phillips et al. | |
| 7,878,891 B2 | 2/2011 | Chiu | |
| 8,127,253 B2 | 2/2012 | Sauve et al. | |
| 8,166,040 B2 | 4/2012 | Brindisi et al. | |
| 8,628,087 B2 | 1/2014 | Knowlton et al. | |
| 9,240,059 B2 | 1/2016 | Zises | |
| 9,773,018 B2 | 9/2017 | Cheung | |
| 2002/0002504 A1 | 1/2002 | Engel et al. | |
| 2002/0027694 A1 | 3/2002 | Kim et al. | |
| 2002/0116286 A1 | 8/2002 | Walker et al. | |
| 2002/0174021 A1 | 11/2002 | Chu et al. | |
| 2002/0178014 A1 | 11/2002 | Alexander | |
| 2003/0004831 A1 | 1/2003 | Owens | |
| 2003/0018652 A1 | 1/2003 | Heckerman et al. | |
| 2003/0028873 A1 | 2/2003 | Lemmons | |
| 2003/0200159 A1 | 10/2003 | Kay et al. | |
| 2003/0229537 A1 | 12/2003 | Dunning et al. | |
| 2004/0153505 A1 | 8/2004 | Verdi et al. | |
| 2004/0205040 A1 * | 10/2004 | Yoshioka | G06N 5/02 706/50 |
| 2004/0243501 A1 | 12/2004 | Duffey, Jr. | |
| 2005/0004850 A1 | 1/2005 | Gutbrod et al. | |
| 2005/0050576 A1 | 3/2005 | Upendran et al. | |
| 2005/0174591 A1 | 8/2005 | Sowinski et al. | |
| 2005/0182792 A1 | 8/2005 | Israel et al. | |
| 2005/0222987 A1 | 10/2005 | Vadon | |
| 2006/0004850 A1 | 1/2006 | Chowdhury | |
| 2006/0058948 A1 | 3/2006 | Blass et al. | |
| 2006/0085270 A1 | 4/2006 | Ruckart | |
| 2006/0113383 A1 | 6/2006 | Scott et al. | |
| 2006/0149625 A1 | 7/2006 | Koningstein | |
| 2006/0190293 A1 | 8/2006 | Richards | |
| 2006/0218153 A1 | 9/2006 | Voon et al. | |
| 2006/0265234 A1 | 11/2006 | Peterkofsky et al. | |
| 2007/0015586 A1 | 1/2007 | Huston | |
| 2007/0060112 A1 | 3/2007 | Reimer | |
| 2007/0150369 A1 | 6/2007 | Livin | |
| 2007/0198505 A1 | 8/2007 | Fuller | |
| 2007/0244924 A1 | 10/2007 | Sadovsky et al. | |
| 2007/0290037 A1 | 12/2007 | Arellanes et al. | |
| 2008/0046956 A1 | 2/2008 | Kulas | |
| 2008/0059970 A1 | 3/2008 | Gonen | |
| 2008/0104054 A1 | 5/2008 | Spangler | |
| 2008/0114807 A1 | 5/2008 | Sembower | |
| 2008/0154710 A1 | 6/2008 | Varma | |
| 2008/0163311 A1 | 7/2008 | St. John-larkin | |
| 2008/0165032 A1 | 7/2008 | Lee et al. | |
| 2008/0176545 A1 | 7/2008 | Dicke et al. | |
| 2008/0186226 A1 | 8/2008 | Ratnakar | |
| 2008/0207357 A1 | 8/2008 | Savarese et al. | |
| 2008/0208852 A1 | 8/2008 | Kuttikkad et al. | |
| 2008/0285940 A1 | 11/2008 | Kulas | |
| 2009/0006208 A1 | 1/2009 | Grewal et al. | |
| 2009/0019487 A1 | 1/2009 | Kulas | |
| 2009/0055199 A1 | 2/2009 | Yusuf | |
| 2009/0083096 A1 | 3/2009 | Cao et al. | |
| 2009/0144624 A1 | 6/2009 | Barnes, Jr. | |
| 2009/0228342 A1 | 9/2009 | Walker et al. | |
| 2009/0232354 A1 | 9/2009 | Camp et al. | |
| 2009/0258687 A1 | 10/2009 | Weichselbaum | |
| 2009/0262137 A1 | 10/2009 | Walker et al. | |
| 2009/0271293 A1 | 10/2009 | Parkhurst et al. | |
| 2009/0299824 A1 | 12/2009 | Barnes, Jr. | |
| 2009/0319373 A1 | 12/2009 | Barrett | |
| 2009/0324137 A1 | 12/2009 | Stallings et al. | |
| 2010/0049663 A1 | 2/2010 | Kane et al. | |
| 2010/0082447 A1 | 4/2010 | Lin et al. | |
| 2010/0153378 A1 | 6/2010 | Sardesai | |
| 2010/0161605 A1 | 6/2010 | Gabrilovich et al. | |
| 2010/0171758 A1 | 7/2010 | Maassel et al. | |
| 2010/0198700 A1 | 8/2010 | Ramaswamy | |
| 2010/0211900 A1 | 8/2010 | Fujioka | |
| 2010/0235259 A1 | 9/2010 | Farraro et al. | |
| 2010/0257024 A1 | 10/2010 | Holmes et al. | |
| 2010/0281029 A1 | 11/2010 | Parikh et al. | |
| 2010/0332283 A1 | 12/2010 | Ng et al. | |
| 2011/0004517 A1 | 1/2011 | Soto et al. | |
| 2011/0040655 A1 | 2/2011 | Hendrickson | |
| 2011/0078305 A1 | 3/2011 | Varela | |
| 2011/0128300 A1 | 6/2011 | Gay et al. | |
| 2011/0143731 A1 | 6/2011 | Ramer et al. | |
| 2011/0148924 A1 | 6/2011 | Tapley et al. | |
| 2011/0153614 A1 | 6/2011 | Solomon | |
| 2011/0173191 A1 | 7/2011 | Tsaparas et al. | |
| 2011/0184780 A1 | 7/2011 | Alderson et al. | |
| 2011/0187306 A1 | 8/2011 | Aarestrup et al. | |
| 2011/0202394 A1 | 8/2011 | Borom et al. | |
| 2011/0238478 A1 | 9/2011 | Gottfurcht et al. | |
| 2012/0054204 A1 | 3/2012 | Agarwal et al. | |
| 2012/0084812 A1 | 4/2012 | Thompson et al. | |
| 2012/0099800 A1 | 4/2012 | Llano et al. | |
| 2012/0123673 A1 | 5/2012 | Perks et al. | |
| 2012/0130792 A1 | 5/2012 | Polk, Jr. et al. | |
| 2012/0150436 A1 | 6/2012 | Rossano et al. | |
| 2012/0166322 A1 | 6/2012 | Simon | |
| 2012/0185330 A1 | 7/2012 | Kleinrock et al. | |
| 2012/0185492 A1 | 7/2012 | Israel et al. | |
| 2012/0197764 A1 | 8/2012 | Nuzzi et al. | |
| 2012/0203614 A1 | 8/2012 | Chen et al. | |
| 2012/0203639 A1 | 8/2012 | Webster et al. | |
| 2012/0215612 A1 | 8/2012 | Ramer et al. | |
| 2012/0235817 A1 | 9/2012 | Forster | |
| 2012/0239513 A1 | 9/2012 | Oliver et al. | |

(56) References Cited

U.S. PATENT DOCUMENTS

| | | |
|---|---|---|
| 2012/0253908 A1 | 10/2012 | Ouimet et al. |
| 2012/0269116 A1 | 10/2012 | Xing et al. |
| 2012/0303479 A1 | 11/2012 | Derks et al. |
| 2012/0313969 A1 | 12/2012 | Szymczyk et al. |
| 2013/0030955 A1 | 1/2013 | David |
| 2013/0071816 A1 | 3/2013 | Singh et al. |
| 2013/0086029 A1 | 4/2013 | Hebert |
| 2013/0106910 A1 | 5/2013 | Sacco |
| 2013/0116922 A1 | 5/2013 | Cai et al. |
| 2013/0124189 A1 | 5/2013 | Baldwin |
| 2013/0132221 A1 | 5/2013 | Bradford et al. |
| 2013/0170697 A1 | 7/2013 | Zises |
| 2013/0185679 A1 | 7/2013 | Fretwell et al. |
| 2013/0191723 A1 | 7/2013 | Pappas et al. |
| 2013/0198002 A1 | 8/2013 | Nuzzi et al. |
| 2013/0244784 A1 | 9/2013 | Assa |
| 2013/0311506 A1 | 11/2013 | Taubman et al. |
| 2013/0325839 A1 | 12/2013 | Goddard et al. |
| 2014/0006389 A1 | 1/2014 | Garcia et al. |
| 2014/0067564 A1 | 3/2014 | Yuan |
| 2014/0095348 A1 | 4/2014 | Goulart |
| 2014/0176565 A1 | 6/2014 | Adeyoola et al. |
| 2014/0213333 A1 | 7/2014 | Hanes et al. |
| 2015/0024840 A1 | 1/2015 | Poon et al. |
| 2015/0052171 A1 | 2/2015 | Cheung |
| 2015/0134694 A1* | 5/2015 | Burke .................... G06Q 10/00 707/769 |
| 2016/0048905 A1 | 2/2016 | Yuan |

FOREIGN PATENT DOCUMENTS

| | | |
|---|---|---|
| CN | 101772779 A | 7/2010 |
| CN | 103443817 A | 12/2013 |
| EP | 2015244 A1 | 1/2009 |
| EP | 2034433 A1 | 3/2009 |
| GB | 2418275 A | 3/2006 |
| JP | 2010-141371 A | 6/2010 |
| JP | 2012-529685 A | 11/2012 |
| KR | 10-2007-0014532 A | 2/2007 |
| KR | 10-0856585 B1 | 9/2008 |
| KR | 10-2010-0067921 A | 6/2010 |
| KR | 10-2010-0071559 A | 6/2010 |
| WO | 2010/141939 A1 | 12/2010 |
| WO | 2012/106096 A1 | 8/2012 |
| WO | 2012/135293 A2 | 10/2012 |
| WO | 2013/063299 A1 | 5/2013 |
| WO | 2013/101903 A2 | 7/2013 |
| WO | 2015/023367 A1 | 2/2015 |

OTHER PUBLICATIONS

Rule 312 Amendment after Notice of Allowance dated Aug. 10, 2017 for U.S. Appl. No. 14/067,795 dated May 19, 2017, 10 pages.
Applicant Initiated Interview Summary Received for U.S. Appl. No. 14/067,795 dated Mar. 17, 2017, 3 pages.
Examiner Initiated Interview Summary Received for U.S. Appl. No. 14/067,795 dated Aug. 30, 2016, 2 pages.
Final Office Action received for U.S. Appl. No. 14/067,795, dated Jun. 1, 2016, 13 pages.
Non-Final Office Action received for U.S. Appl. No. 14/067,795, dated Jan. 26, 2017, 17 pages.
Non-Final Office Action received for U.S. Appl. No. 14/067,795, dated Sep. 25, 2015, 10 pages.
Notice of Allowance received for U.S. Appl. No. 14/067,795, dated May 19, 2017, 25 pages.
Response to Amendment under Rule 312 received for U.S. Appl. No. 14/067,795, dated Aug. 16, 2017, 3 pages.
Response to Final Office Action filed on Aug. 22, 2016 for U.S. Appl. No. 14/067,795 dated Jun. 1, 2016, 6 pages.
Response to Non-Final Office Action filed on Feb. 25, 2016 for U.S. Appl. No. 14/067,795, dated Sep. 25, 2015, 9 pages.

Response to Non-Final Office Action filed on Mar. 22, 2017 for U.S. Appl. No. 14/067,795, dated Jan. 26, 2017, 15 pages.
Applicant Initiated Interview Summary received for U.S. Appl. No. 14/067,795, dated Aug. 17, 2016, 3 pages.
"Draw Something", Retrieved from the Internet URL: <http://omgpop.com/drawsomething>, May 2, 2013, 2 pages.
Politicology, "Facebook Gives POLITICO Access to Your Political Beliefs", Retrieved from the Internet URL: <http://www.ology.com/post/51413/facebook-gives-politico-access-to-your-political-beliefs>, Accessed on Jun. 28, 2012, 4 pages.
mlb.com, "MLB at Bat", Retrieved from the Internet: <URL: https://www.mlb.com/apps/atbat>, Accessed on Apr. 19, 2018, 6 pages.
=First Action Interview Pre-Interview Communication received for U.S. Appl. No. 14/925,526, dated Nov. 21, 2018, 5 pages.
Google Play, "AgingBooth", Retrieved from the Internet URL: <https://play.google.com/store/apps/details?id=com.piviandco.agingbooth&hl=en_IN>, Jan. 7, 2019, 4 pages.
Kraft, "Real Time Baseball Aguemented Reality", Washington University Open Scholarship, Retrieved from the Internet URL: <http://dx.doi.org/10.7936/K7HH6H84>, 2011, 11 pages.
Mulloni et al., "Handheld Augmented Reality Indoor Navigation with Activity-Based Instructions", Proceedings of the 13th International Conference on Human Computer Interaction with Mobile Devices and Services, Aug. 30-Sep. 2, 2011, 10 pages.
Newby, "Facebook, Politico to Measure Sentiment of GOP Candidates by Collecting Posts", 2006-2012 Clarity Digital Group LLC d/b/a Examiner.com, Jan. 16, 2012, 3 pages.
Sifry, "Politico-Facebook Sentiment Analysis Will Generate "Bogus" Results, Expert Says", Retrieved from the Internet: <http://techpresident.com/news/21618/politico-facebook-sentiment-analysis-bogus>, Jan. 13, 2012, 4 pages.
Vlahakis, et al., "ARCHEOGUIDE: First Results of an Augmented Reality, Mobile Computing System in Cultural Heritage Sites", 2001, 10 pages.
Wikipedia, "Exquisite Corpse", Retrieved from the Internet: <URL: http://en.wikipedia.org/wiki/Exquisite_corpse>, Accessed on Feb. 4, 2019, 3 pages.
Restriction Requirement Received for U.S. Appl. No. 14/925,526, dated Aug. 15, 2018, 5 pages.
Response to Restriction Requirement filed on Oct. 22, 2018 for U.S. Appl. No. 14/925,526, dated Aug. 15, 2018, 9 pages.
Final Office Action received for U.S. Appl. No. 13/359,630, dated Sep. 22, 2015, 29 Pages.
Final Office Action received for U.S. Appl. No. 13/359,630, dated Nov. 29, 2013, 21 pages.
Non-Final Office Action received for U.S. Appl. No. 13/359,630, dated Jun. 13, 2016, 40 pages.
Non-Final Office Action received for U.S. Appl. No. 13/359,630, dated Jun. 7, 2013, 23 pages.
Non-Final Office Action received for U.S. Appl. No. 13/359,630, dated Oct. 29, 2014, 29 pages.
Notice to Non-Compliant Amendment received for U.S. Appl. No. 13/359,630, dated Apr. 23, 2015, 3 pages.
Notice to Non-Compliant Amendment received for U.S. Appl. No. 13/359,630, dated Feb. 25, 2015, 2 pages.
Restriction Requirement received for U.S. Appl. No. 13/359,630, dated Apr. 29, 2013, 6 pages.
Response to Final Office Action filed on Mar. 22, 2016 for U.S. Appl. No. 13/359,630 dated Sep. 22, 2015, 30 pages.
Response to Final Office Action filed on Mar. 31, 2014 for U.S. Appl. No. 13/359,630 dated Nov. 29, 2013, 17 pages.
Response to Non-Compliant Amendment filed on Jun. 23, 2015 for U.S. Appl. No. 13/359,630, dated Apr. 23, 2015, 31 pages.
Response to Non-Final Office Action filed on Mar. 30, 2015 for U.S. Appl. No. 13/359,630, dated Oct. 29, 2014, 31 pages.
Response to Non-Final Office Action filed on Oct. 7, 2013 for U.S. Appl. No. 13/359,630, dated Jun. 7, 2013, 15 pages.
Response to Restriction Requirement filed on May 21, 2013 for U.S. Appl. No. 13/359,630, dated Apr. 29, 2013, 10 pages.
Final Office Action received for U.S. Appl. No. 13/599,580, dated May 1, 2015, 15 pages.

(56) References Cited

OTHER PUBLICATIONS

Final Office Action received for U.S. Appl. No. 13/599,580, dated Jan. 15, 2014, 25 pages.
Non-Final Office Action received for U.S. Appl. No. 13/599,580, dated Nov. 14, 2014, 17 pages.
Non-Final Office Action received for U.S. Appl. No. 13/599,580, dated Sep. 17, 2013, 20 pages.
Response to Final Office Action filed on Apr. 15, 2014 for U.S. Appl. No. 13/599,580 dated Jan. 15, 2014, 18 pages.
Response to Non-Final Office Action filed on Dec. 17, 2013 for U.S. Appl. No. 13/599,580, dated Sep. 17, 2013, 18 pages.
Response to Non-Final Office Action filed on Feb. 17, 2015 for U.S. Appl. No. 13/599,580, dated Nov. 14, 2014, 19 pages.
Response to Non-Compliant Amendment filed on Apr. 14, 2015 for U.S. Appl. No. 13/599,580, dated Feb. 25, 2015, 7 pages.
Duke University, "How to Write Advertisements that Sell", Company: System, the magazine of Business, 1912, 137 pages.
MobiTV, "MobiTV", Retrieved from the Internet: <URL: http://www.mobitv.com/>, Accessed on Mar. 30, 2015, 1 page.
International Preliminary Report on Patentability Received for PCT Application No. PCT/US2014/044947 dated Feb. 25, 2016, 6 pages.
International Search Report Received for PCT Application No. PCT/US2014/044947 dated Oct. 30, 2014, 2 pages.
International Written Opinion received for PCT Application No. PCT/US2014/044947 dated Oct. 30, 2014, 4 pages.
Slingbox, "Sling Media, Inc.", Retrieved from the Internet: <URL: http://www.slingbox.com/>, Accessed on Mar. 30, 2015, 4 pages.

\* cited by examiner

FIG. 7

| | | |
|---|---|---|
| ONE CATEGORY  902 | | PERMIT ONLY ONE CATEGORY CONSTRAINT AT A TIME. EX: {STRING} @ SPORTS AUTHORITY = SPORTING GOODS CATEGORY |
| MANY CATEGORIES  904 | | MULTIPLE CATEGORY CONSTRAINTS AT A TIME. EX: {LION} @ SF ZOO = CSA + TOYS & HOBBIES + DOLLS CATS |
| MANY CATEGORIES + TIME  906 | | ADD TIME AS A DIMENSION FOR MULTIFUNCTIONAL VENUES. EX: {SHIRT} @ MSG ON 12/8 (KNICKS) = SPORTS MEM CAT, ON 12/9 (ROD STEWART) = ENTERTAINMENT MEM CAT, 6/4 (DOG SHOW) = PET SUPPLIES CAT |

FIG. 9

CATEGORY-CONSTRAINED QUERYING USING POSTAL ADDRESSES

RELATED APPLICATION

This application is a continuation of U.S. application Ser. No. 14/067,795, filed Oct. 30, 2013, which claims the benefit of priority to U.S. Provisional Patent Application Ser. No. 61/865,426, filed Aug. 13, 2013, each of which hereby incorporated by reference in its entirety.

BACKGROUND

In a publication system such as an ecommerce system, search queries are received that may be ambiguous in that the search query may relate to and may be satisfied by a number of different of categories of products or services. Desired is a way to disambiguate search queries based on additional identifiable information that may be used as a hint or a clue to the disambiguated search query so that a response may be constrained one or more categories of products or services that may reasonably satisfy the search query.

DESCRIPTION OF THE DRAWINGS

Some embodiments are illustrated by way of example and not limitation in the figures of the accompanying drawings:

FIG. 7 is an illustration of a number of ambiguous search queries that are each disambiguated so as to be satisfied by a particular category of items, according to an example embodiment.

FIG. 9 is an illustration of another method for disambiguating a search query by location so that the query may be satisfied by a plurality of categories of products, according to an example embodiment.

DETAILED DESCRIPTION

Example systems and methods for disambiguating an ambiguous search query which, without disambiguation, could be satisfied by products or services from different categories. If a user enters into a search box of a publication system a query such as "string," the query could be satisfied by thong-style underwear, violin strings, guitar strings, tennis racquet strings, archery bow strings, and the like. Disambiguation of ambiguous search queries so that a response may be constrained to one or more categories of items that may meaningfully satisfy the query is therefore desired. Such disambiguation and constraint may be accomplished by the app described herein.

The disambiguation app could function as a product category matcher which matches categories of items to an ambiguous search query based on additional geolocation data of the user when the user enters the ambiguous search query.

In one embodiment, the app may provide the publication system with disambiguation information which may be the geolocation of the user, including a store if the user is in a store when entering an ambiguous search query from a mobile device. Based on the disambiguation information, such as the geolocation information, the publication system uses the information to constrain the category items provided in response to the search query to a category related to the geolocation of the user.

Example System

Figure 1:
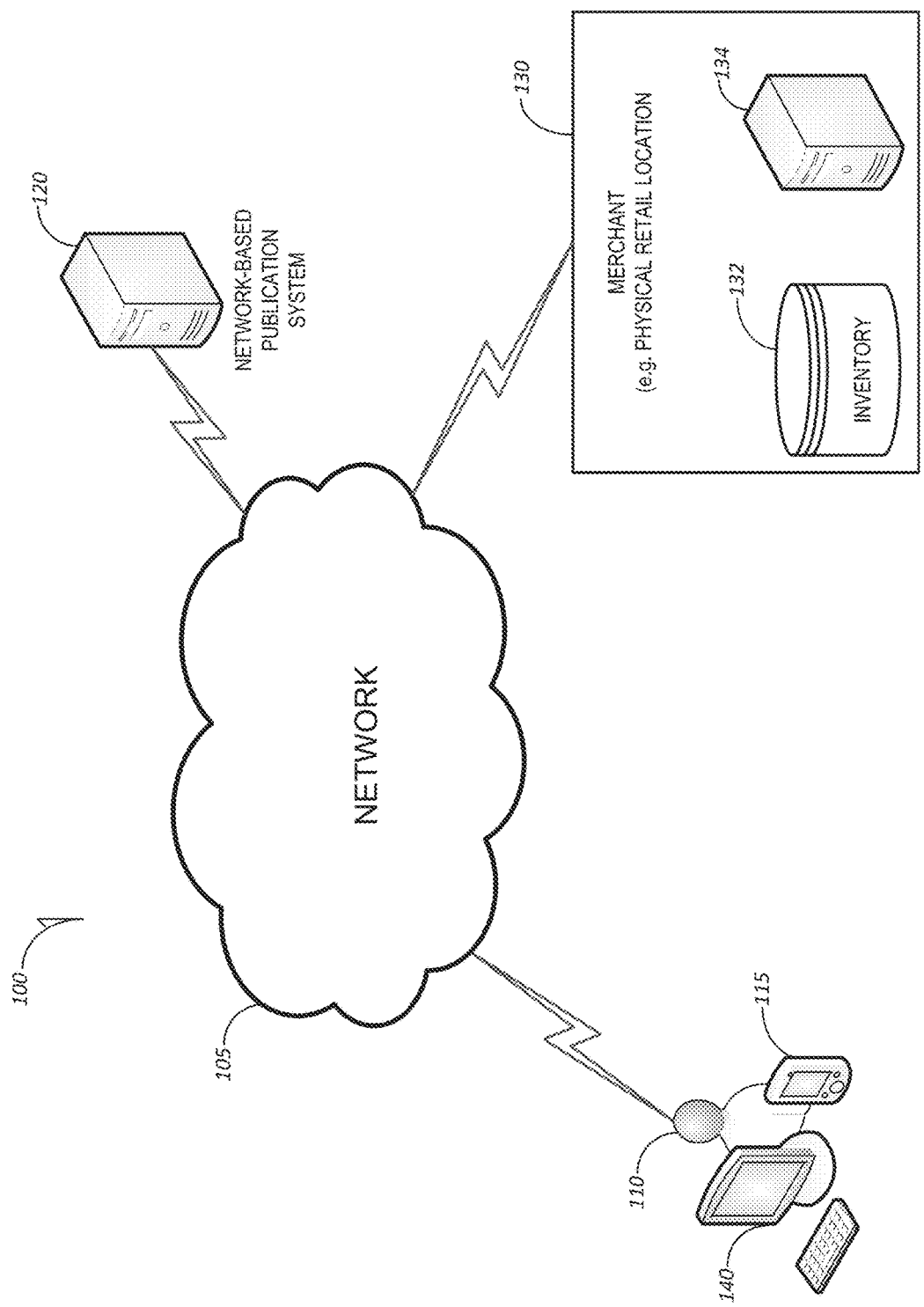
FIG. 1 is a block diagram depicting a system for delivering queries to a publication system, according to an example embodiment.

FIG. 1 is a block diagram depicting a system 100 for delivering search queries and results thereto, according to an example embodiment. The system 100 can include a user 110, a network-based publication system 120 with a search engine, and one or more merchants 130 (and merchant systems). In an example, the user 110 can connect to the network-based publication system 120 via a mobile or other device 115, 140 (e.g., desktop, laptop, smart phone, PDA, or similar electronic device capable of some form of data connectivity). The network-based publication system 120 will receive and process a query from the user's mobile device 115. Generally, location information specifying the physical or geographical location of the user 110 will be received with the query. For example, the mobile device 115 can include a GPS unit to inform the mobile device 115 of its location, such that the location information of the mobile device 115 can be shared with the network-based publication system 120. Other known techniques for deriving location information may be used with both mobile and non-mobile client computing devices, for example, such as desktop computers, etc. For instance, with some embodiments, the location information indicating the location of the user 110 may be explicitly specified by the user 110, for example, by the user 110 interacting with a map.

In an example, the merchant 130 can operate computer systems, such as an inventory system 132 or a POS system 134. The network-based publication system 120 can interact with any of the systems 132, 134 used by merchant 130 for operation of the merchant's retail or service business. In an example, the network-based publication system 120 can work with both POS system 134 and inventory system 132 to obtain access to inventory available at individual retail locations run by the merchant 130. This inventory information can be used in both generating product or service listings, and selecting and ordering search results served by the network-based publication system 120.

Example Operating Environment

With some embodiments, the user may explicitly indicate or specify his or her current location for use as disambiguation information. However, with some embodiments, location information of the user may be derived with a mobile computing device of the user.

Figure 2:
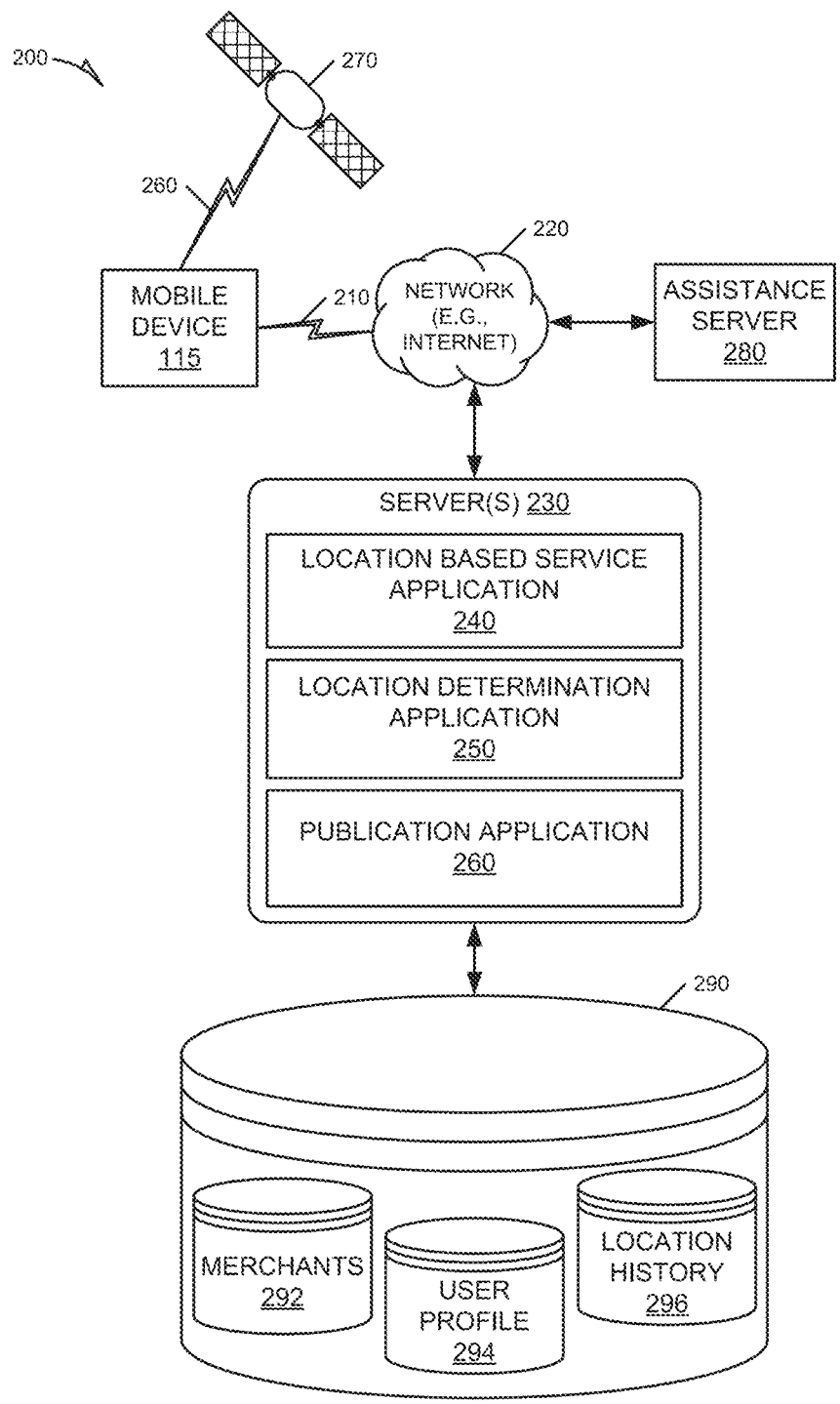
FIG. 2 is a block diagram illustrating an environment for operating a mobile device, according to an example embodiment.

FIG. 2 is a block diagram illustrating an environment 200 for operating a mobile device 115, according to an example embodiment. The environment 200 is an example environment within which methods of serving search results can be operated. In another example, environment 200 can host a navigated shopping service, which can also include the methods of serving search results discussed herein. The environment 200 can include a mobile device 115, a communication connection 210, a network 220, servers 230, a communication satellite 270, a merchant server 280, and a database 290. The servers 230 can optionally include location based service application 240, location determination application 250, publication application 260 with search engine 261, and payment application 265. The database 290 can optionally include merchant databases 292, user profile database 294, and/or location history database 296. The mobile device 115 represents one example device that can be utilized by a user to receive offers and share context information associated with the user. The mobile device 115 may be any of a variety of types of devices (for example, a cellular telephone, a PDA, a Personal Navigation Device (PND), a handheld computer, a tablet computer, a notebook computer, or other type of movable device). The mobile device 115 may interface via a connection 210 with a communication network 220. Depending on the form of the mobile device 115, any of a variety of types of connections 210 and communication networks 220 may be used.

In an example embodiment, the connection 210 may be Code Division Multiple Access (CDMA) connection, a Global System for Mobile communications (GSM) connection, or other type of cellular connection. Such connection 210 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 220 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, LTE network, or other types of networks).

In another example, the connection 210 may be Wireless Fidelity (Wi-Fi, IEEE 802.11x type) connection, a Worldwide Interoperability for Microwave Access (WiMAX) connection, or another type of wireless data connection. In such an embodiment, the communication network 220 may include one or more wireless access points coupled to a local area network (LAN), a wide area network (WAN), the Internet, or other packet-switched data network.

In yet another example, the connection 210 may be a wired connection, for example an Ethernet link, and the communication network may be a LAN, a WAN, the Internet, or other packet-switched data network. Accordingly, a variety of different configurations are expressly contemplated.

A plurality of servers 230 may be coupled via interfaces to the communication network 220, for example, via wired or wireless interfaces. These servers 230 may be configured to provide various types of services to the mobile device 115. In an example embodiment, one or more servers 230 may execute location based service (LB S) applications 240, which interoperate with software executing on the mobile device 115, to provide LBSs to a user. LBSs can use knowledge of the device's location, and/or the location of other devices and/or retail stores, etc., to provide location-specific information, recommendations, notifications, interactive capabilities, and/or other functionality to a user. With some embodiments, the LBS operates in conjunction with the publication application 260 and search engine 261, in particular, to provide search results that are arranged based on the distance or travel time between a mobile device 115 (or other computer device) and a retail store. For example, an LBS application 240 can provide location data to a network-based publication system 120, which can then be used to arrange a set of search results, based on distance and/or travel time between two locations. Knowledge of the mobile device's location, and/or the location of other devices, may be obtained through interoperation of the mobile device 115 with a location determination application 250 executing on one or more of the servers 230. Location information may also be provided by the mobile device 115, without use of a location determination application such as application 250. In certain examples, the mobile device 115 may have some limited location determination capabilities that are augmented by the location determination application 250.

Example Mobile Device

Figure 3:
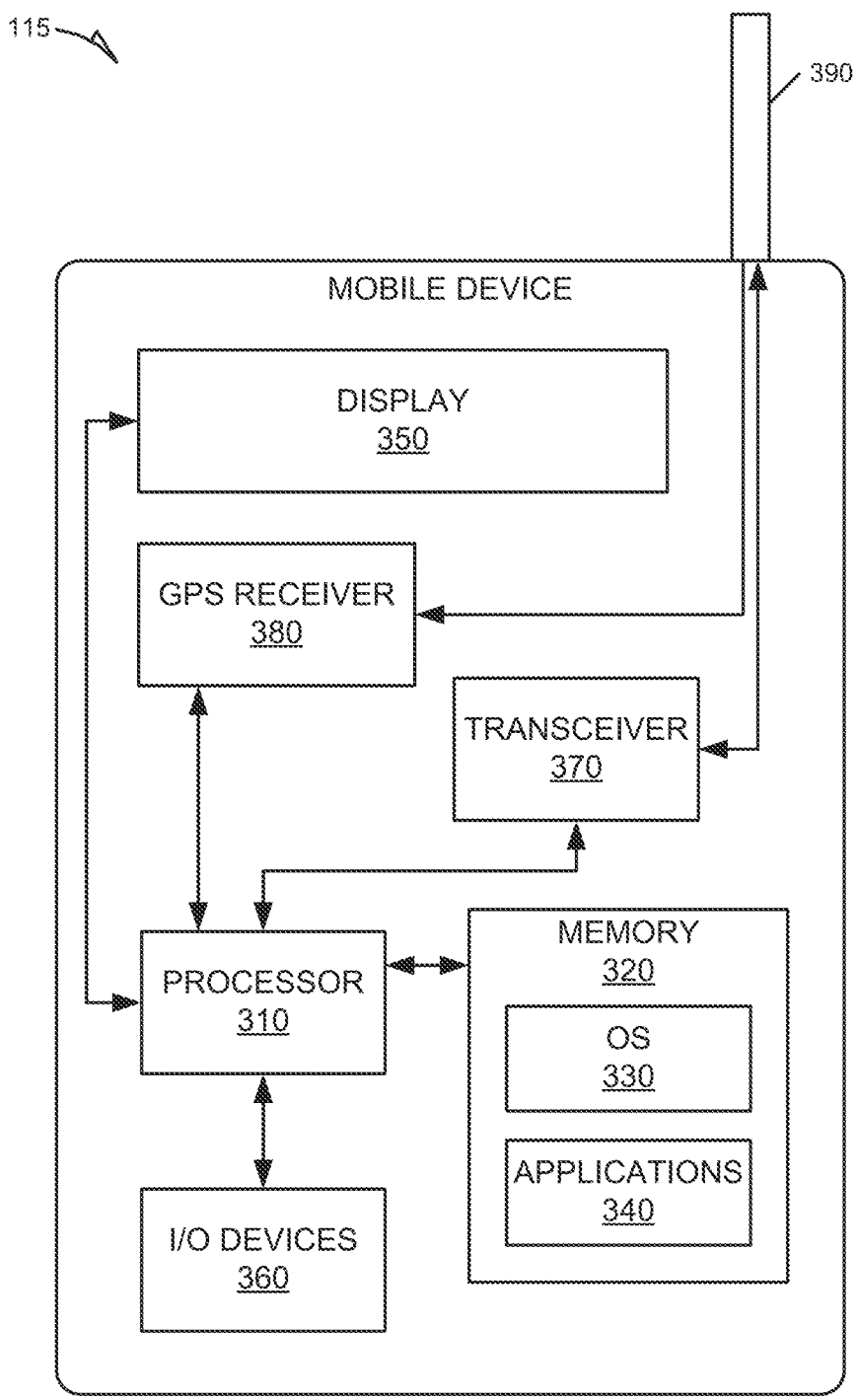
FIG. 3 is a block diagram illustrating a mobile device, according to an example embodiment.

FIG. 3 is a block diagram illustrating the mobile device 115, according to an example embodiment. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor 310. The memory 320 may be adapted to store an operating system (OS) 330, as well as application programs 340, such as a mobile location enabled applications that may provide LBSs to a user. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. In this manner, the connection 210 with the communication network 220 may be established. Further, in some configurations, a GPS receiver 380 may also make use of the antenna 390 to receive GPS signals.

Additional detail regarding providing and receiving location-based services can be found in U.S. Pat. No. 7,848,765, titled "Location-Based Services," granted to Phillips et al. and assigned to Where, Inc. of Boston, Mass., which is hereby incorporated by reference.

An example geolocation concept discussed within U.S. Pat. No. 7,848,765 is a geofence. A geofence can be defined as a perimeter or boundary around a physical location or mobile object (e.g., a user). A geofence can be as simple as a radius around a physical location defining a circular region around the location. However, a geofence can be any geometric shape or an arbitrary boundary drawn on a map. A geofence can be used to determine a geographical area of interest for the calculation of demographics, advertising, presenting search results, or similar purposes. Geofences can be used in conjunction with identifying and presenting search results, as described herein. For example, a geofence can be used to assist in determining whether a user (or mobile device associated with the user) is within a geographic area of a particular merchant. If the user is within a geofence established by the merchant or the publication system, the systems discussed herein can use that information to identify and present search results (e.g., via a mobile device associated with the user).

Example Platform Architecture

Figure 4:
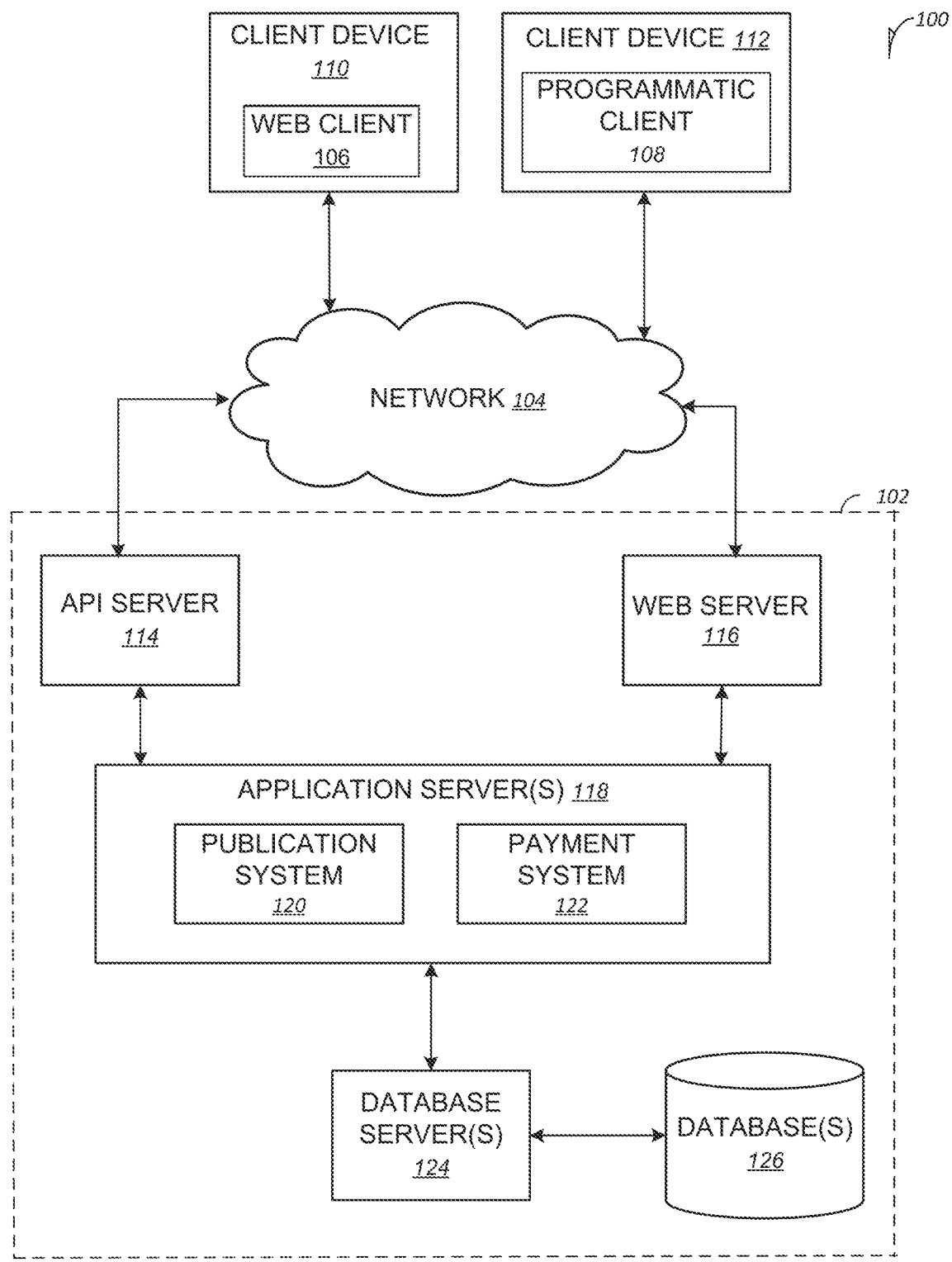
FIG. 4 is a block diagram illustrating a network-based publication system for delivering search results, according to an example embodiment.

FIG. 4 is a network diagram depicting a network system 101, according to one embodiment, having a client-server architecture configured for exchanging data over a network. For example, the network system 101 may include a network-based publisher 102 where clients may communicate and exchange data within the network system 101. The data may pertain to various functions (e.g., online item purchases) and aspects (e.g., managing content) associated with the network system 101 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet, wireless network, cellular network, or a Wide Area Network (WAN)) to one or more clients. The one or more clients may include users that utilize the network system 101 and more specifically, the network-based publisher 102, to exchange data over the network 104. These transactions may include transmitting, receiving (communicating) and processing data to, from, and regarding content and users of the network system 101. The data may include, but are not limited to, content and user data such as feedback data; user profiles; user attributes; product attributes; product and service reviews; product, service, manufacture, and vendor recommendations and identifiers; social network commentary, product and service listings associated with buyers and sellers; auction bids; and transaction data, among other things.

In various embodiments, the data exchanges within the network system 101 may be dependent upon user-selected functions available through one or more client or user interfaces (UIs). The UIs may be associated with a client device, such as a client device 110 using a web client 106. The web client 106 may be in communication with the network-based publisher 102 via a web server 116. The UIs may also be associated with a client device 112 using a programmatic client 108, such as a client application. It can be appreciated in various embodiments the client devices 110, 112 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things. The client devices 110 and 112 may comprise a mobile phone, desktop computer, laptop, or any other communication device that a user may use to access the network-based publisher 102.

Turning specifically to the network-based publisher 102, an application program interface (API) server 114 and a web server 116 are coupled to, and provide programmatic and web interfaces respectively to, one or more application servers 118. The application servers 118 host one or more publication application(s) of publication system 120 and one or more payment systems 122. The application server(s) 118 are, in turn, shown to be coupled to one or more database server(s) 124 that facilitate access to one or more database(s) 126.

In one embodiment, the web server 116 and the API server 114 communicate and receive data pertaining to products, listings, transactions, social network commentary and feedback, among other things, via various user input tools. For example, the web server 116 may send and receive data to and from a toolbar or webpage on a browser application (e.g., web client 106) operating on a client device (e.g., client device 110). The API server 114 may send and receive data to and from an application (e.g., client application 108) running on another client device (e.g., client device 112).

The publication system 120 publishes content on a network (e.g., the Internet). As such, the publication system 120 provides a number of publication and marketplace functions and services to users that access the network-based publisher 102. For example, the publication application(s) of publication system 120 may provide a number of services and functions to users for listing goods and/or services for sale, facilitating transactions, and reviewing and providing feedback about transactions and associated users. Additionally, the publication application(s) of publication system 120 may track and store data and metadata relating to products, listings, transactions, and user interaction with the network-based publisher 102. The publication application(s) of publication system 120 may aggregate the tracked data and metadata to perform data mining to identify trends or patterns in the data. While the publication system 120 may be discussed in terms of a marketplace environment, it may be noted that the publication system 120 may be associated with a non-marketplace environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal account, or credit card) for purchases of items via the network-based marketplace. While the publication system 120 and the payment system 122 are shown in FIG. 1 to both form part of the network-based publisher 102, it will be appreciated that, in alternative embodiments, the payment system 122 may form part of a payment service that may be separate and distinct from the network-based publisher 102.

Example Notification Modules

Figure 5:
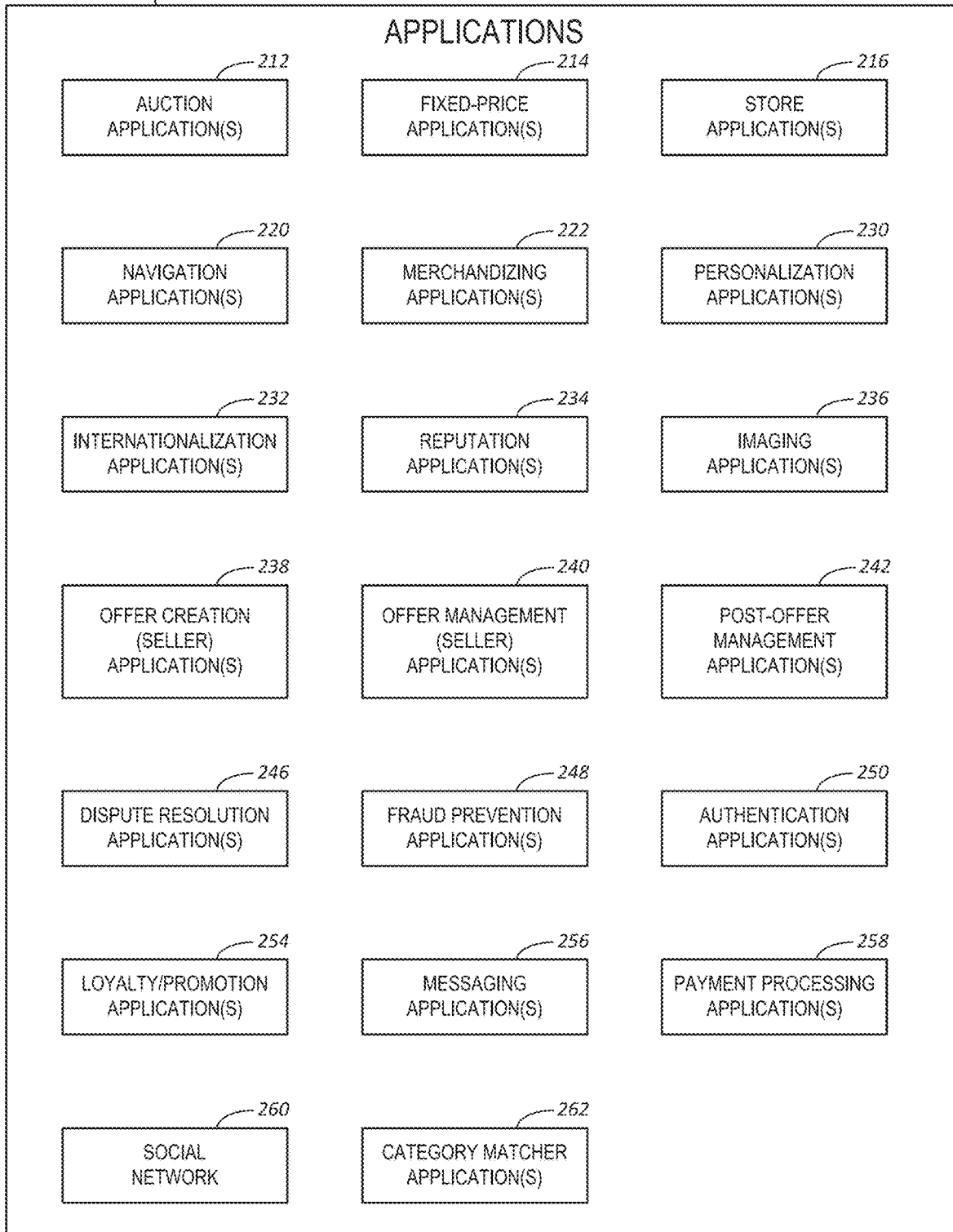
FIG. 5 is a block diagram illustrating applications useable as part of a publication system, according to an example embodiment.

FIG. 5 illustrates a block diagram showing applications of application server(s) that are part of the network system 101, in an example embodiment. In this embodiment, the publication system 120, and the payment system 120 may be hosted by the application server(s) 118 of the network system 101. The publication system 120 and the payment system 122 may be hosted on dedicated or shared server machines (not shown) that are communicatively coupled to enable communications between server machines. The applications themselves may be communicatively coupled (e.g., via appropriate interfaces) to each other and to various data sources, so as to allow information to be passed between the applications or so as to allow the applications to share and access common data.

The publication system 120 are shown to include at least one or more auction application(s) 212 which support auction-format listing and price setting mechanisms (e.g., English, Dutch, Vickrey, Chinese, Double, Reverse auctions etc.). The auction application(s) 212 may also provide a number of features in support of such auction-format listings, such as a reserve price feature whereby a seller may specify a reserve price in connection with a listing and a proxy-bidding feature whereby a bidder may invoke automated proxy bidding. The auction-format offer in any format may be published in any virtual or physical marketplace medium and may be considered the point of sale for the commerce transaction between a seller and a buyer (or two users).

One or more fixed-price application(s) 214 support fixed-price listing formats (e.g., the traditional classified advertisement-type listing or a catalogue listing) and buyout-type listings. Specifically, buyout-type listings (e.g., including the Buy-It-Now® (BIN) technology developed by eBay Inc., of San Jose, Calif.) may be offered in conjunction with auction-format listings, and allow a buyer to purchase goods or services, which are also being offered for sale via an auction, for a fixed-price that may be typically higher than the starting price of the auction.

The application(s) of the application server(s) 118 may include one or more store application(s) 216 that allow a seller to group listings within a "virtual" store. The virtual store may be branded and otherwise personalized by and for the seller. Such a virtual store may also offer promotions, incentives and features that are specific and personalized to a relevant seller.

Navigation of the online marketplace may be facilitated by one or more navigation application(s) 220. For example, a search application (as an example of a navigation application) may enable key word searches of listings published via the network-based publisher 102. A browse application may allow users to browse various category, catalogue, or inventory data structures according to which listings may be classified within the network-based publisher 102. Various other navigation applications may be provided to supplement the search and browsing applications.

Merchandizing application(s) 222 support various merchandising functions that are made available to sellers to enable sellers to increase sales via the network-based publisher 102. The merchandizing application(s) 222 also operate the various merchandising features that may be invoked by sellers, and may monitor and track the success of merchandising strategies employed by sellers.

Personalization application(s) 230 allow users of the network-based publisher 102 to personalize various aspects of their interactions with the network-based publisher 102. For example, a user may, utilizing an appropriate personalization application 230, create a personalized reference page at which information regarding transactions to which the user may be (or has been) a party may be viewed. Further, the personalization application(s) 230 may enable a third party to personalize products and other aspects of their interactions with the network-based publisher 102 and other parties, or to provide other information, such as relevant business information about themselves.

The publication system 120 may include one or more internationalization application(s) 232. In one embodiment, the network-based publisher 102 may support a number of marketplaces that are customized, for example, for specific geographic regions. A version of the network-based publisher 102 may be customized for the United Kingdom, whereas another version of the network-based publisher 102 may be customized for the United States. Each of these versions may operate as an independent marketplace, or may be customized (or internationalized) presentations of a common underlying marketplace. The network-based publisher 102 may accordingly include a number of internationalization application(s) 232 that customize information (and/or the presentation of information) by the network-based publisher 102 according to predetermined criteria (e.g., geographic, demographic or marketplace criteria). For example, the internationalization application(s) 232 may be used to support the customization of information for a number of regional web sites that are operated by the network-based publisher 102 and that are accessible via respective web servers.

Reputation application(s) 234 allow users that transact, utilizing the network-based publisher 102, to establish, build and maintain reputations, which may be made available and published to potential trading partners. Consider that where, for example, the network-based publisher 102 supports person-to-person trading, users may otherwise have no history or other reference information whereby the trustworthiness and credibility of potential trading partners may be assessed. The reputation application(s) 234 allow a user, for example through feedback provided by other transaction partners, to establish a reputation within the network-based publisher 102 over time. Other potential trading partners may then reference such a reputation for the purposes of assessing credibility and trustworthiness.

In order to make listings, available via the network-based publisher 102, as visually informing and attractive as possible, the publication system 120 may include one or more imaging application(s) 236 utilizing which users may upload images for inclusion within listings. An imaging application 236 also operates to incorporate images within viewed listings. The imaging application(s) 236 may also support one or more promotional features, such as image galleries that are presented to potential buyers. For example, sellers may generally pay an additional fee to have an image included within a gallery of images for promoted items.

The publication system 120 may include one or more offer creation application(s) 238. The offer creation application(s) 238 allow sellers conveniently to author products pertaining to goods or services that they wish to transact via the network-based publisher 102. Offer management application(s) 240 allow sellers to manage offers, such as goods, services, or donation opportunities. Specifically, where a particular seller has authored and/or published a large number of products, the management of such products may present a challenge. The offer management application(s) 240 provide a number of features (e.g., auto-reproduce, inventory level monitors, etc.) to assist the seller in managing such products. One or more post-offer management application(s) 242 also assist sellers with a number of activities that typically occur post-offer. For example, upon completion of an auction facilitated by one or more auction application(s) 212, a seller may wish to leave feedback regarding a particular buyer. To this end, a post-offer management application 242 may provide an interface to one or more reputation application(s) 234, so as to allow the seller conveniently to provide feedback regarding multiple buyers to the reputation application(s) 234.

The dispute resolution application(s) 246 may provide mechanisms whereby disputes arising between transacting parties may be resolved. For example, the dispute resolution application(s) 246 may provide guided procedures whereby the parties are guided through a number of steps in an attempt to settle a dispute. In the event that the dispute cannot be settled via the guided procedures, the dispute may be escalated to a mediator or arbitrator.

The fraud prevention application(s) 248 may implement various fraud detection and prevention mechanisms to reduce the occurrence of fraud within the network-based publisher 102. The fraud prevention application(s) may prevent fraud with respect to the third party and/or the client user in relation to any part of the request, payment, information flows and/or request fulfillment. Fraud may occur with respect to unauthorized use of financial instruments, non-delivery of goods, and abuse of personal information.

Authentication application(s) 250 may verify the identity of a user, and may be used in conjunction with the fraud prevention application(s) 248. The user may be requested to submit verification of identity, an identifier upon making the purchase request, for example. Verification may be made by a code entered by the user, a cookie retrieved from the device, a phone number/identification pair, a username/password pair, handwriting, and/or biometric methods, such as voice data, face data, iris data, finger print data, and hand data. In some embodiments, the user may not be permitted to login without appropriate authentication. The system (e.g., the FSP) may automatically recognize the user, based upon the particular network-based device used and a retrieved cookie, for example.

The network-based publisher 102 itself, or one or more parties that transact via the network-based publisher 102, may operate loyalty programs and other types of promotions that are supported by one or more loyalty/promotions application(s) 254. For example, a buyer/client user may earn loyalty or promotions points for each transaction established and/or concluded with a particular seller/third party, and may be offered a reward for which accumulated loyalty points can be redeemed.

The application server(s) 118 may include messaging application(s) 256. The messaging application(s) 256 are responsible for the generation and delivery of messages to client users and third parties of the network-based publisher 102. Information in these messages may be pertinent to services offered by, and activities performed via, the payment system 120. Such messages, for example, advise client users regarding the status of products (e.g., providing "out of stock" or "outbid" notices to client users) or payment status (e.g., providing invoice for payment, Notification of a Payment Received, delivery status, invoice notices). Third parties may be notified of a product order, payment confirmation and/or shipment information. Respective messaging application(s) 256 may utilize any one of a number of message delivery networks and platforms to deliver messages to users. For example, messaging application(s) 256 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

The payment system 120 may include one or more payment processing application(s) 258. The payment processing application(s) 258 may receive electronic invoices from the merchants and may receive payments associated with the electronic invoices. The payment system 120 may also make use of functions performed by some applications included in the publication system 120.

The publication system 120 may include one or more social network application(s) 260.

Figure 8:
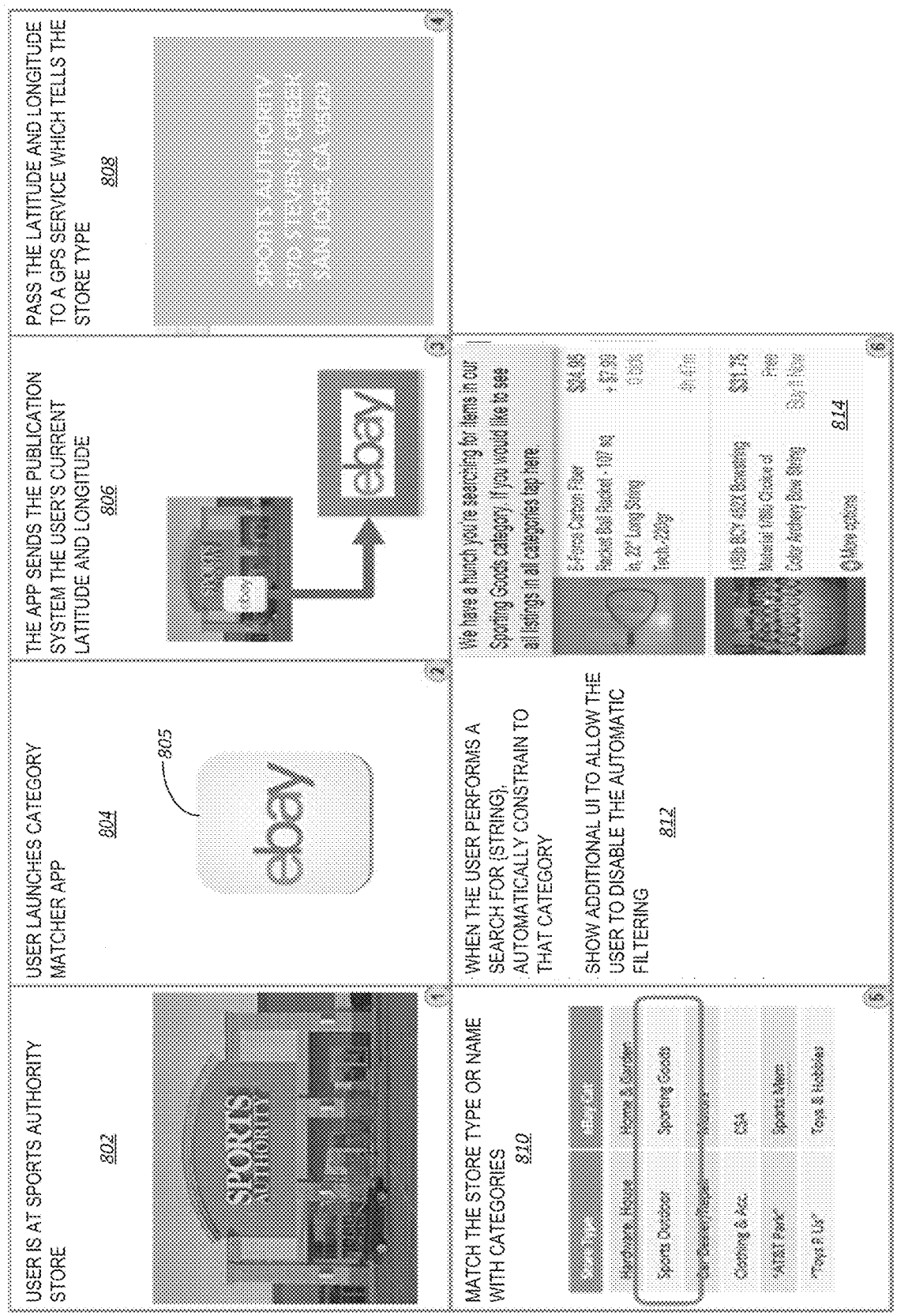
FIG. 8 is an illustration of a method for disambiguating a search query by location information so that it may be satisfied by a particular category of items, according to an example embodiment.

The publication system 120 may also include one or more category matcher application(s) 262 which may be used for mapping item categories to ambiguous search queries by geo-location, described in more detail with respect to FIG. 8

Figure 6:
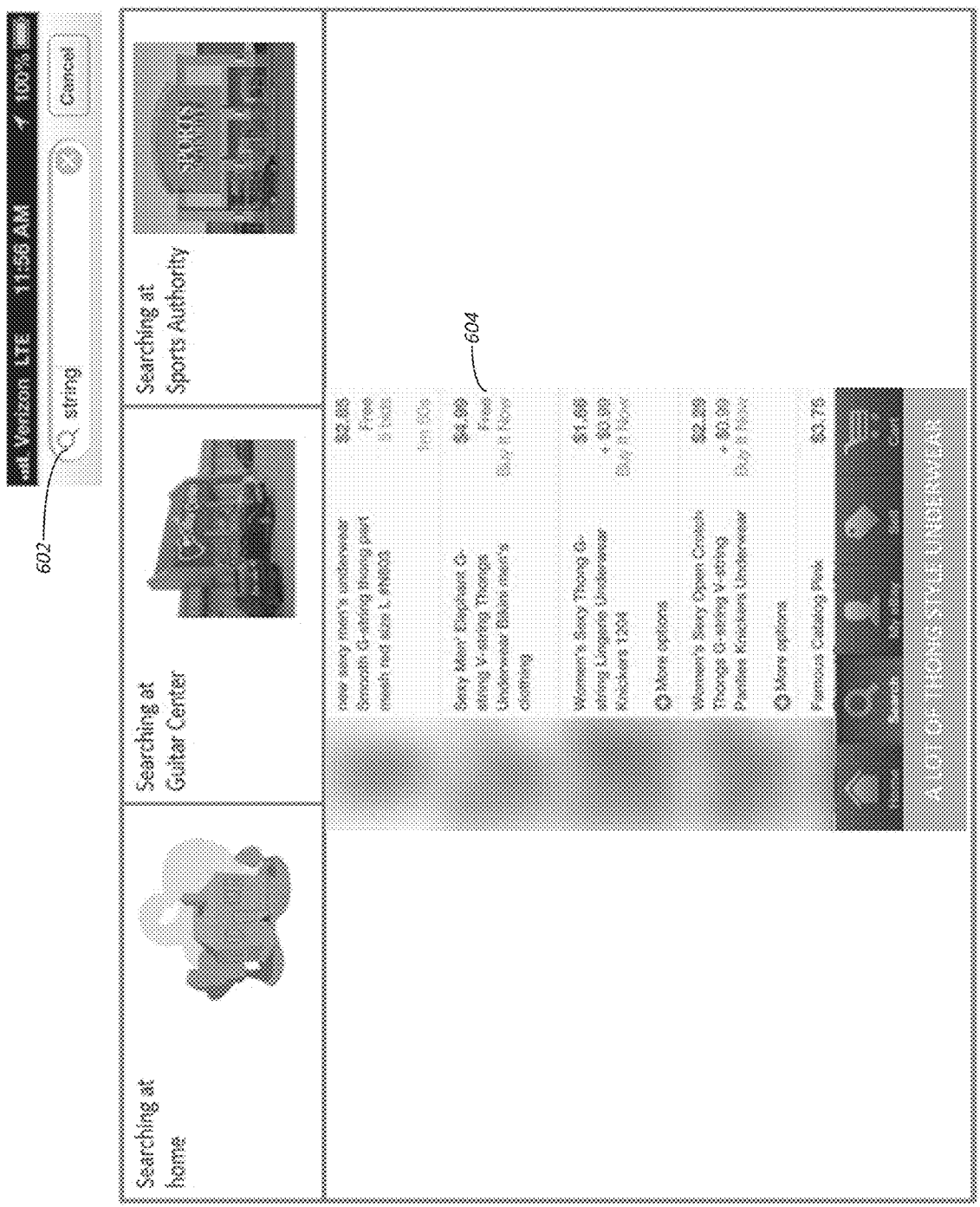
FIG. 6 is an illustration of an ambiguous search query that can be satisfied by a number of unrelated categories of items, according to an example embodiment.

FIG. 6 is an illustration of a user entering an ambiguous search query as at 602 where the user enters the search query "string." The ambiguity of the search query "string" means that when it is provided to a publication system, it may be satisfied by a number of unrelated item categories. For example, "string" could refer to thong type bathing suits or underwear, tennis racquet strings, guitar strings, among other item categories. In one embodiment the search query is entered using the mobile device 115. FIG. 6 illustrate a category of thong clothing that may satisfy the search query "string."

Figure 7:
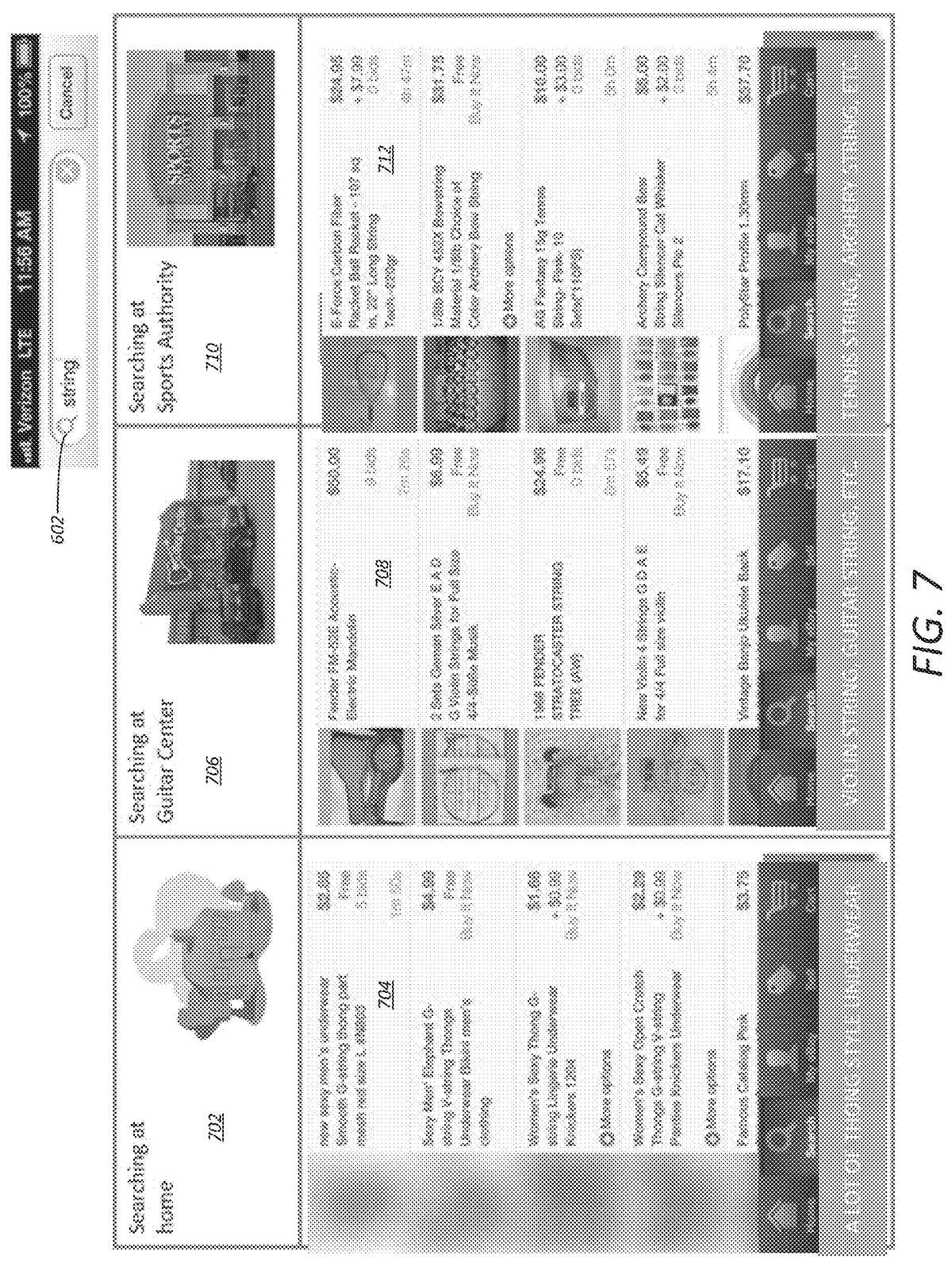

FIG. 7 is an illustration of matching item categories to an ambiguous query, here "string," by disambiguating the query by location. The query "string" is entered at 602, as it was for FIG. 6. If the user were at home 702 when the search query was entered, it may be assumed, while not conclusively, that the search query "string" may be satisfied by the category of items thong style underwear 704. If the user is at a music stores such as Guitar Center 706, it is likely when the user enters the search query "string" the meaning may be related to music. Therefore, the publication may return various guitar or violin strings 708. If the user is at a sporting goods store such as Sports Authority 710, it is likely that the user, when entering the search term "string" means strings related to sports such as tennis racquet strings, archery bow strings, and the like. In that case the publication system may respond with categories of items constrained to such items as racquet string and archery bow strings 712.

FIG. 8 illustrates a horizontal flow illustrating a method according to one embodiment. At 802 the user may be at a Sports Authority store. At 804 a user may launch the category matcher app described herein. The launch may be initiated by tapping the app icon 805. At or near the time of launching the app, the user may enter the search query "string." In an alternate embodiment, the entering of the search query itself may automatically launch the app. At 806 the app sends the publication system the user's current longitude and longitude. At 808 the publication transmits the latitude and longitude information to a GPS system which provides information to the publication system indicating business information for that latitude and longitude. In this example, the GPS service informs the publication system that the user is at Sports Authority on Stevens Creek Blvd. in San Jose, Calif. In an alternative embodiment, the user may choose to forward a photograph of his location that shows the store type along with the query. Based on the store type, the publication may, at 810, match the store type or name with item categories in the publication database 126. As seen at 810 the store type, Sports, Outdoor, matches the item category Sporting Goods. Therefore, when the user performs a search for "string" the publication system may automatically constrain the item category to tennis racquet strings, bowstrings, and other sporting goods that use strings, as at 814, which essentially filters out categories 704, 708 of FIG. 7. Alternatively the publication may provide an additional user interface to allow the user to disable the automatic filtering. The system may display a notice to the user, for example placed above the search results, to inform the user that the search result set has been altered due to the influence of the geographic location. The user may be given a choice, such as a selectable icon, to remove this geographic location-based filtering. The user may accept the choice, for example, selecting the selectable icon indicating the choice of removing the filtering. The publication may receive this information as a signal that geographic filtering may not be appropriate for this search term. The publication system may store this information. Over time, if many people remove geographic location filtering for this specific search term, the publication system, using analytics, such as determining that the choice of remove filtering exceeds a threshold, may stop automatically applying the filter. For example, if a predetermined number of people were to disable filtering for a particular location, the publication system may stop automatically applying the filter for the location. Stated another way, when users choose to remove filtering, this choice allows publication system analytics to function as a learning system as to the effectiveness of filtering.

FIG. 9 is an illustration of additional embodiments. In one embodiment as at 902, a user at a sporting goods store may be sent only one category of items, here from the sporting goods category as discussed above. In another embodiment, 904, many item categories may be provided to the user who enters a category, say, "lion," from the San Francisco Zoo. The method may proceed as above with the GPS service informing the publication system that the location of the user is at the San Francisco Zoo. In response, the publication system may provide the user with items categories such as clothing, shoes, and accessories relating to the San Francisco Zoo, toys relating to a lions, hobbies relating to lions (or zoos), and dolls relating to the foregoing, as only some examples of item categories.

In yet another embodiment, 906, when a user sends a search query from a location, not only will the longitude and latitude of the user be transmitted to the publication, the time and date of entering the query may be detected as well. The publication system will receive the business information from the GPS service as discussed above. Here the business information may indicate that the user is at Madison Square Garden in New York City. In addition to providing the user with the type of item categories discussed above, by using the time and date for searching information relating to Madison Square Garden in the publication system's database and provide the user with item categories indicate various events that will be at that venue, and their dates. The user could then purchase tickets for one or more of the events.

As another example, the publication system could inquire of a weather service provider for the current weather at the geolocation provided by the user's mobile device. If, as one example, it was bad winter weather, and the geolocation is, or is, near a department store, the publication system could serve up a winter coats category and an advertisement of that department store. Other examples include obtaining age and gender information about the user, for example, by analytics operating on the user's purchases over time, which may provide information as to age and gender. The publication system may then serve up categories for that age and that gender at the geolocation of the user.

Figure 10:
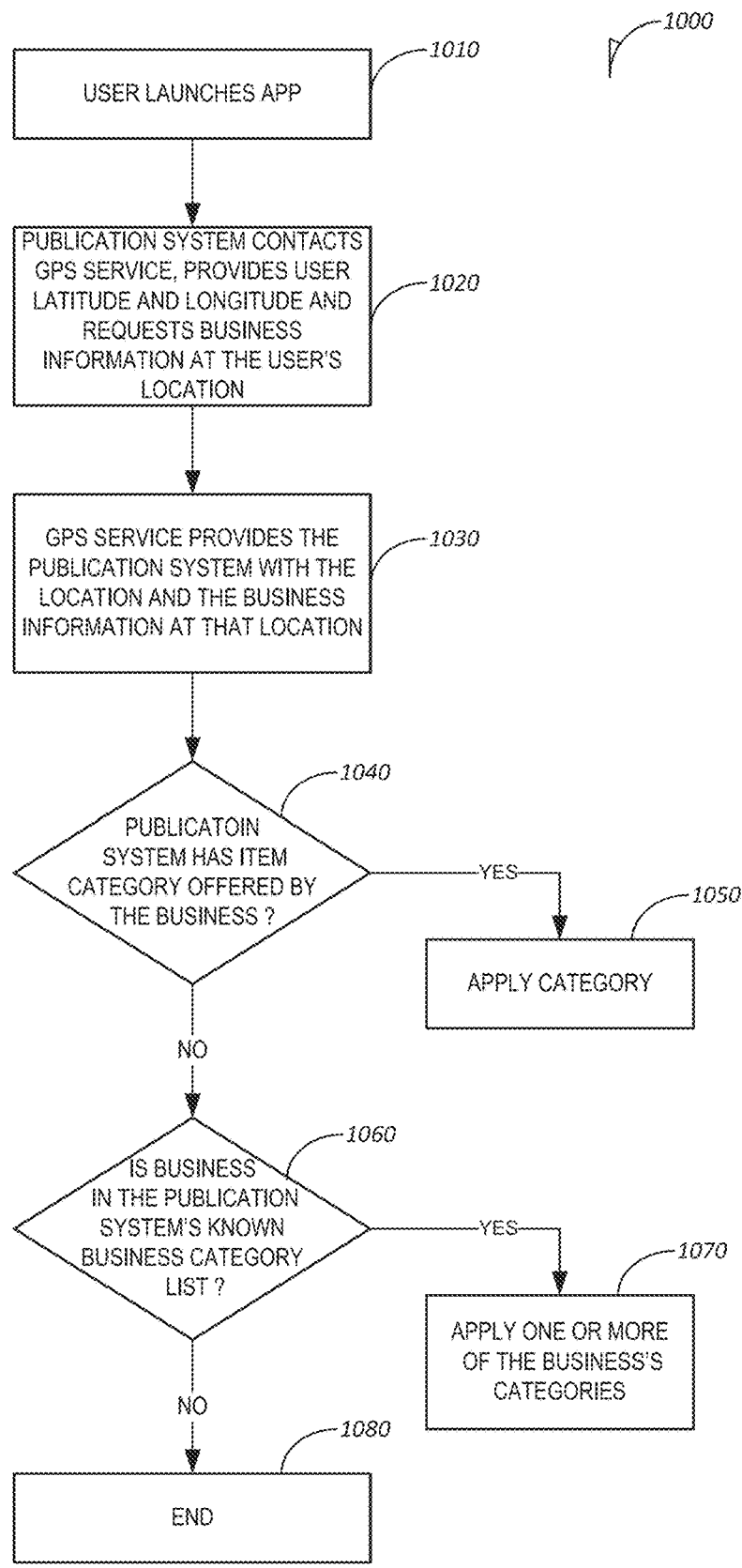
FIG. 10 is a flowchart illustrating a method for disambiguating a search query by location information so that it may be satisfied by a particular category of items, according to an example embodiment.

FIG. 10 is a flowchart illustrating the method 1000 discussed above. At 1010, the user launches the category mapper app. This app may, in some embodiments, be launched automatically, for example when the user enters a search inquiry, or similar user activities. As discussed, the GPS or similar subsystem in the user's device may be transmitted to the publication system. At 1020, the publication contacts the GPS service, provides the user longitude and latitude, and inquires what business information relates to the user's location. At 1030 the GPS service may provide the publication system with the location and the business information at that location, such as the fact that a Sports Authority store is located there. At 1040 the publication system may search its database to determine whether it has one or more item categories offered by the business and that may satisfy the search query. If the YES decision is taken, the category is applied as at 1050, or provided to the user. If the NO decision is taken, the publication system may search its database to determine whether the business, or store, is in the publication system's business category list. If the YES decision is taken, then, although a category that may satisfy the query entered by the user is not available, the publication may, as at 1070, provide the use with one or more of the business's categories other than that which would satisfy the query. If the NO decision is taken, the method may end for this particular query. In a more general outline, the method may work as follows:

User launches the category matcher app.
    Category matcher app pings publication system geo-servers and says "User is here at 37.352131, −122.012381"
    Publication system geo-servers asks GPS service "What's at 37.352131, −122.012381?"
    GPS service returns "Acme store, sells Widgets"
    Publication system geo servers inquire of its database whether widgets are a category in the publication system.
    If Yes, apply widgets category
    If No, the publication system inquires of its database whether Acme Store is a store in the publication system's known store-category list. If Yes, apply the known story-category. If not, end.

Figure 11:
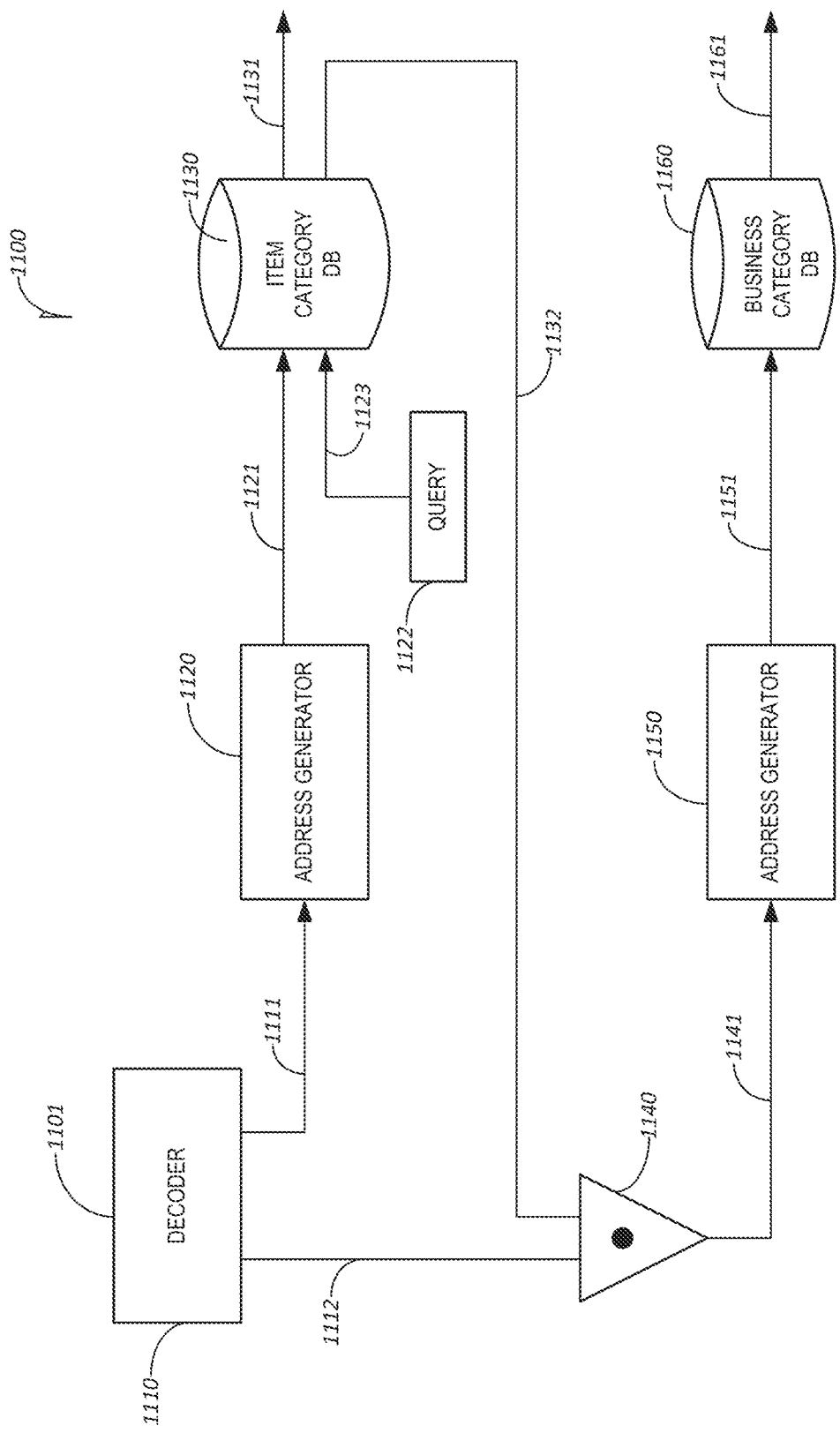
FIG. 11 is an example embodiment.

FIG. 11 is an illustration of example embodiment 1100. The embodiment includes decoder 1110. Decoder 1110 has an input over line (or bus) 1101 which may be from the GPS service discussed above. A line may be used for serial operation while a bus may be used for parallel operation. Decoder 1110 can be an appropriate decoder such as one of those described in the text *Arithmetic Operations in Digital Computers by R. K. Richards*, D. Van Nostrand Company, Inc., 1955. Decoder 1110 is connected via line (or bus) 1111 to address generator 1120. The information provided over line 1111 may be the type of business located at the location indicated by the GPS service. Address generator 1120 may be any well known address generator useful for searching directories and, in one example, may be configured in a manner similar to the address generator disclosed in U.S. Pat. No. 3,675,215. Address generator 1120 is connected via line 1121 to item category database 1130 which may contain a listing of item categories. Item category database 1130 may be part of databases 126 of FIG. 4, in appropriate storage. Query register 1122 may contain the query entered by the user as discussed above. Query register 1122 may be connected to item category database 1130 by line 1123. Item category database 1130 has output line 1131 which is activated if a search of that database at the address or addresses generated by address generator 1120, and corresponding to the type of store at the location, results in finding item categories that would satisfy the query over line 1123. This may be accomplished by comparing the query on line 1123 with the item categories at the address or addresses over line 1121 and, if they compare, reading out those item categories over line 1131. Comparison may be accomplished by well-known apparatus such as that described in FIG. 3 of the above-referenced patent, which figure may be adapted to search for item categories instead of addresses.

Item category database 1130 also has output line 1132 which may be activated if a search of that database at the address or addresses generated by address generator 1120 does not find one or more item categories that satisfy the query in query register 1122. Line 1132 is connected to one input of AND gate 1140. Decoder 1110 is connected via line 1112 as a second input to AND gate 1140. Line 1112 may contain the name of the business located at the location provided by the GPS service. When line 1132 is activated, indicating that one or more item categories matching the query in query register 1122 is not found, the information from line 1112, such as the name of the business, is gated by AND gate 1140 via line 1141 to address generator 1150 which is the same or similar to address generator 1120. Address generator 1150 is connected via line 1151 to business category database 1160 which, like item category database 1130 may be part of databases 126 of FIG. 4. Business category database 1160 may contain one or more of item categories offered by the business named on line 1112. That database has output line 1161 which is activated if a search of that database at the address or addresses generated by address generator 1150 results in finding item categories offered by the business represented by data on line 1112 and may be used to readout that information.

In operation, when the GPS service provides geolocation and business information over line or bus 1101 to decoder 1110, the decoder may decode the name or type of the business at the GPS location over line 1111. Address generator 1120 generates one or more addresses corresponding to the information on line 1111 and at 1121 accesses those addresses in item category database 1130. If there are item categories at the addresses corresponding to the name or type of business on line 1111 from decoder 1110, and that also satisfy the query in query register 1122, those item categories may be readout over line 1131 and may be provided to the user at the location.

On the other hand, if the item categories that satisfy the query in query register 1122 for are not found in item category database 1130, line 1132 is activated and gates business information, which may be the name of the store at the geolocation, from line 1112 through gate 1140 via line 1141 to address generator which generates one or more addresses with which to search business category database 1160. Even though one or more item categories that satisfy the query in query register 1122 are not found in the search of item category database 1130, the search of business category database 1160 may find one or more of the business's item categories other than that item category which would satisfy the query and may send that information to the user at the location.

Instead of, or in addition to, detecting item categories matching a query based on signals such as location and business information provided by a GPS service, other signal may be detected and used to search the item category database 1130 of FIG. 11. Examples of these include the following, along with the technology used to detect those signals.

| Signal | Technology Used to Detect the Signal |
| --- | --- |
| Amount of light that the camera on the smartphone is receiving could be a measurement of being indoors or outdoors. If the user is outdoors a lot, sunglasses would be preferred over regular glasses that might be provided as the item. | The publication system could compare the amount of lumens and color temperature measured by the smartphone's camera to reference models to determine whether the light is likely from being outdoors versus indoors. |
| Motion sensing could determine what the user's most recent activity is. If it's determined that the user does a lot of jogging, the system could suggest more jogging related clothing for ambiguous queries like "pants." | Some smartphone platforms (such as Android) offer APIs that can tell you what type of activity the user is engaged in (biking vs. walking, etc.) For other platforms, we could look at measurements from the accelerometer and compare that to reference models to determine what type of physical activity the user is engaged in. |
| The type of smart phone. When the user does a search for {phone case} the system automatically filters it down to cases that match the model of phone the user has. | Smartphones frequently offer the capability to look up the device model and name. |
| Broaden this to outside of phones and use all manner of facts about the user's previous search behavior on the publication to help filter categories. For example, if the user historically did a lot of search in the stamps category, the system could show more items from the stamps category. | It may be possible to access the search history on the device of other applications. |
| Audio could be detected. For example, the user is searching for {shirt}. In the background is heard Lady Gaga's music playing very loudly. | The publication system could employ technology or partner with others such as, in one example, Shazam, to detect what music is playing in the background and use that as an influence on the search results. |

In each case in the above table, the technology used for detecting the signal could be used to send that signal to the publication system for searching, much like the GPS service sends the signal about geolocation, type of store and name of store.

Each of the above five example cases could be implemented by software such as in the following example.

For Detecting Audio:

```
function getSearchResultsWithAdditionalContext ($seachTermString)
{
   $backgroundAudio = microphone.sample(10); //Turn on the
microphone for 10 seconds
   $backgroundAudioContent =
audioRecognizer($backgroundAudio); //Process the backgrouud audio
recorded - see if there's anything intelligble
   If ($backgroundAudioContent.detected == true) //If we were able
to glean something from the background audio
   {
      Return getSearchResults ($searchTermString,
$audioArtist); //Then get the search results, passing in the audio's artist
as a term.
   }
   else
      return getSearchResults ($searchTermString);
}
```

The other example cases can be similarly implemented by software code.

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
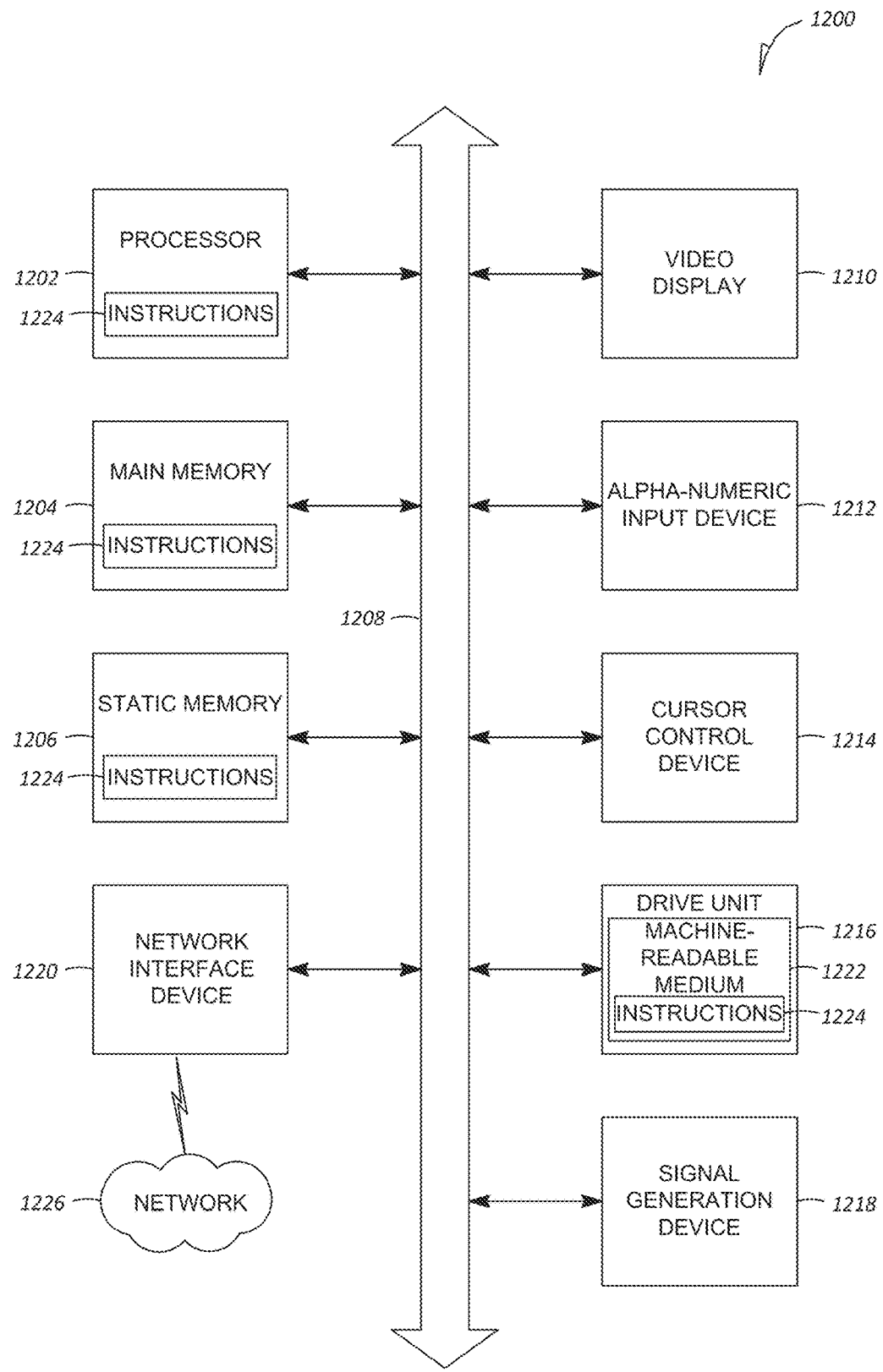
FIG. 12 is a diagrammatic representation of a machine in the example form of a computer system within which a set of instructions for causing the machine to perform any one or more of the methodologies discussed herein may be executed.

FIG. 12 is a block diagram of machine in the example form of a computer system 1200 within which there may be executed instructions 1224 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., user interface (UI) navigation device or computer mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of data structures and instructions 1224 (e.g., software) embodying or used by any one or more of the methodologies or functions described herein. The instructions 1224 may also reside, completely or at least partially, within the main memory 1204, static memory 1206, and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions for execution by the machine and that cause the machine to perform any one or more of the methodologies of the embodiments of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks. A "machine-readable storage medium" shall also include devices that may be interpreted as transitory, such as register memory, processor cache, and RAM, among others. The definitions provided herein of machine-readable medium and machine-readable storage medium are applicable even if the machine-readable medium is further characterized as being "non-transitory." For example, any addition of "non-transitory," such as non-transitory machine-readable storage medium, is intended to continue to encompass register memory, processor cache and RAM, among other memory devices.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, Plain Old Telephone (POTS) networks, and wireless data networks (e.g., Wi-Fi and IMAX networks). The term "transmission medium" shall be taken to include any intangible medium that is capable of storing, encoding or carrying instructions for execution by the machine, and includes digital or analog communications signals or other intangible media to facilitate communication of such software.

Although the present inventive subject matter has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method, comprising:
   receiving, by a distributed system, a query from a client device, the distributed system including a plurality of subsystems each associated with one or more categories;
   determining a plurality of categories associated with the query;
   identifying a postal address within a predefined proximity of a location of the client device;
   determining at least one category of the plurality of categories unassociated with the postal address;
   determining one or more remaining categories that exclude the at least one category from the plurality of categories unassociated with the postal address;
   transmitting the query to one or more subsystems of the distributed system associated with the one or more remaining categories; and
   presenting a plurality of items responsive to the query from the one or more subsystems.

2. The computer-implemented method of claim 1, wherein identifying at least one category unassociated with the postal address:
   determining one or more item categories associated with the query;
   determining one or more business categories associated with the postal address; and
   determining the at least one category as a set difference of the one or more item categories and the one or more business categories.

3. The computer-implemented method of claim 2, wherein the one or more remaining categories include the one or more business categories.

4. The computer-implemented method of claim 1, further comprising:
   determining one or more first categories associated with the postal address; and
   sorting the plurality of items such that one or more first items of the one or more first categories are ordered before one or more second items of other categories of the one or more remaining categories.

5. The computer-implemented method of claim 1, further comprising:
   determining one or more first categories associated with the postal address; and
   constraining the one or more remaining categories to the one or more first categories.

6. The computer-implemented method of claim 1, further comprising:
   presenting a user interface element indicating that the plurality of items are sorted or filtered based on a geographic location.

7. The computer-implemented method of claim 6, further comprising:
   receiving an input via the user interface element to deactivate sorting or filtering of the plurality of items based on the geographic location;
   transmitting the query to one or more first subsystems of the distributed system associated with the at least one category excluded from the plurality of categories; and
   presenting a second plurality of items responsive to the query from the one or more first subsystems.

8. The computer-implemented method of claim 6, further comprising:
   receiving an input via the user interface element to deactivate sorting or filtering of the plurality of items based on the geographic location;
   transmitting the query to the plurality of subsystems; and
   presenting a second plurality of items responsive to the query from the plurality of subsystems.

9. The computer-implemented method of claim 6, further comprising:
   receiving a number of inputs to deactivate sorting or filtering based on the geographic location that exceeds a predetermined number; and
   deactivating automated sorting or filtering for the geographic location.

10. The computer-implemented method of claim 1, further comprising:
    receiving a time or a date associated with the query; and
    sorting the plurality of items based on the time or the date.

11. The computer-implemented method of claim 1, further comprising:
    receiving weather information associated with the location; and
    sorting the plurality of items based on the weather information.

12. The computer-implemented method of claim 1, further comprising:
    identifying a user associated with the client device;
    receiving a search history of the user; and
    sorting the plurality of items based on the search history.

13. A system, comprising:
    a plurality of processors;
    memory including instructions that, upon execution by the plurality of processors, cause the system to:
       receive a query from a client device;
       determine a plurality of categories associated with the query, wherein each subsystem of the system is associated with one or more categories of the plurality of categories;
       identify a postal address within a predefined proximity of a location of the client device;
       determine at least one category unassociated with the postal address;
       determine one or more remaining categories that exclude the at least one category from the plurality of categories unassociated with the postal address;
       transmit the query to one or more subsystems associated with the one or more remaining categories; and
       present a plurality of items responsive to the query from the one or more subsystems.

14. The system of claim 13, wherein the instructions upon execution further cause the system to:
    receive ambient light information from one or more cameras of the client device;
    determine an environment of the client device indicating whether the client device is located indoors or outdoors based on the ambient light information; and
    sort the plurality of items based on the environment.

15. The system of claim 13, wherein the instructions upon execution further cause the system to:
    receive motion information from the client device;
    determine a user activity based on the motion information; and
    sort the plurality of items based on the user activity.

16. The system of claim 13, wherein the instructions upon execution further cause the system to:
    determine a type of the client device; and
    sort the plurality of items based on the type of the client device.

17. A computer-implemented method, comprising:
    receiving, by a client device, a query to be transmitted to a distributed system including a plurality of subsystems each associated with one or more categories;
    determining a plurality of categories associated with the query;
    identifying a postal address within a predefined proximity of a location of the client device;
    determining at least one category of the plurality of categories unassociated with the postal address;
    determining one or more remaining categories that exclude the at least one category from the plurality of categories unassociated with the postal address;
    transmitting the query to one or more subsystems of the distributed system associated with the one or more remaining categories; and
    presenting a plurality of items responsive to the query from the one or more subsystems.

18. The computer-implemented method of claim 17, wherein the query is received by a browser application executing on the client device.

19. The computer-implemented method of claim 17, wherein the query is received by a standalone client application executing on the client device.

20. The computer-implemented method of claim 17, further comprising:
    capturing audio data using one or more microphones of the client device;
    identifying a performer generating the audio data; and
    sorting the plurality of items such that one or more media items associated with the performer are ordered before one or more other items of the plurality of items.

* * * * *